(12) United States Patent
Lindsay

(10) Patent No.: US 8,011,732 B2
(45) Date of Patent: Sep. 6, 2011

(54) TILTABLE ANTI-PINCH SEAT ASSEMBLY AND PINCH GUARD

(75) Inventor: Derek Shane Lindsay, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 114 days.

(21) Appl. No.: 12/424,304

(22) Filed: Apr. 15, 2009

(65) Prior Publication Data

US 2010/0264710 A1 Oct. 21, 2010

(51) Int. Cl.
*A47B 97/00* (2006.01)
*A47C 31/00* (2006.01)

(52) U.S. Cl. ............. 297/463.1; 297/452.38; 297/463.2

(58) Field of Classification Search ............... 297/463.2, 297/463.1, 452.38
See application file for complete search history.

(56) References Cited

U.S. PATENT DOCUMENTS

| | | | |
|---|---|---|---|
| 3,632,168 A | 1/1972 | Barello et al. | |
| 5,288,133 A * | 2/1994 | Mizushima et al. | 297/452.38 |
| 5,772,283 A * | 6/1998 | Yoshida et al. | 297/452.38 X |
| 5,788,329 A | 8/1998 | Pilarczyk et al. | |
| 6,024,411 A | 2/2000 | Pesta et al. | |
| 6,149,241 A * | 11/2000 | Waku et al. | 297/463.2 |
| 6,183,032 B1 | 2/2001 | Champ | |
| 6,186,595 B1 | 2/2001 | Ward et al. | |
| 6,196,610 B1 | 3/2001 | Pesta et al. | |
| 6,227,619 B1 | 5/2001 | Pesta et al. | |
| 6,883,457 B2 | 4/2005 | Lipscombe | |
| 7,070,223 B2 * | 7/2006 | Jeong | 297/452.38 X |
| 7,201,437 B2 | 4/2007 | Freijy | |
| 7,237,846 B1 * | 7/2007 | Arima | 297/452.38 |
| 7,338,103 B2 | 3/2008 | Muck et al. | |
| 7,360,842 B2 * | 4/2008 | Sayed et al. | 297/463.1 |
| 2005/0194826 A1 | 9/2005 | O'Callaghan et al. | |
| 2006/0138844 A1 | 6/2006 | La Voie et al. | |
| 2008/0164739 A1 | 7/2008 | Valasin et al. | |

FOREIGN PATENT DOCUMENTS

JP 2002-144931 5/2002

* cited by examiner

*Primary Examiner* — Anthony D Barfield
(74) *Attorney, Agent, or Firm* — Rankin Hill & Clark LLP

(57) ABSTRACT

A tiltable anti-pinch vehicle seat assembly for an associated vehicle is provided. The seat assembly includes a seat and a tilt assembly is provided for supporting the seat and is disposed between the seat and a chassis of the associated vehicle. The tilt assembly is capable of moving the seat between a forward tilted position and a rearward latched position. The tilt assembly includes a first latching member. A second latching member is secured to the chassis of the associated vehicle for selectively engaging the latch and the latch and the striker cooperate to maintain the seat in the rearward latched position. A pinch guard housing is disposed about the first and second latching members. The housing substantially covers the first latching member, the second latching member, and a pinch zone defined between the first latching member and the second latching member when the tilt assembly is in the forward tilted position.

22 Claims, 6 Drawing Sheets

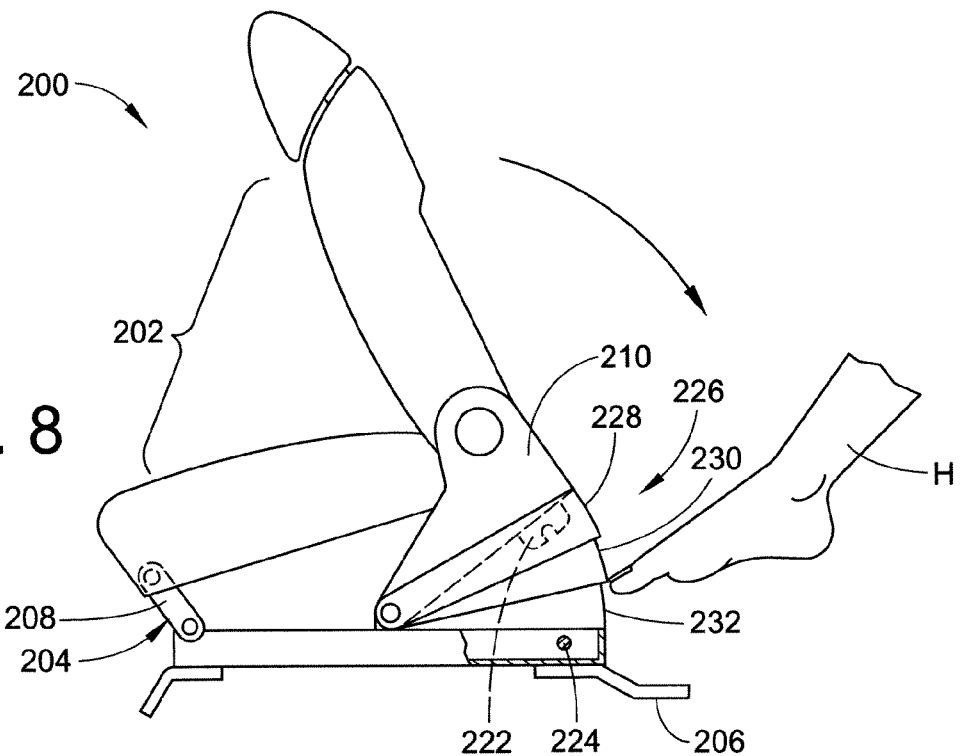
FIG. 8
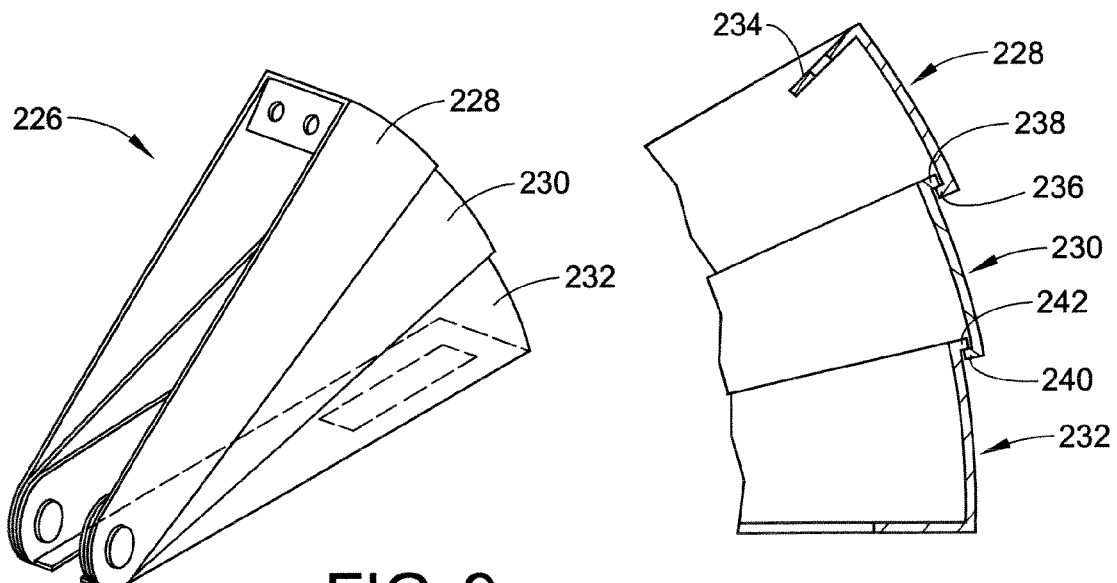
FIG. 9
FIG. 10

TILTABLE ANTI-PINCH SEAT ASSEMBLY AND PINCH GUARD

BACKGROUND

The present disclosure relates to protective devices for vehicle seating systems. In particular, the present disclosure relates to anti-pinch vehicle seat assemblies and pinch guards for preventing injury to occupants of a vehicle involving seat mechanisms.

Prior art vehicle seating systems include various convenience features which allow a vehicle seat to be adjusted in various directions, folded, stowed, and/or removed from the vehicle. Such systems are implemented for a variety of reasons, but primarily involve enabling an occupant to more comfortably situate himself or herself in a vehicle, providing for additional cargo space, and/or aiding in the ingress and egress of occupants into and out of the vehicle.

However, and particularly with respect to seating assemblies that permit the seat assembly to pivot forward or "stand", a number of pinch hazards may exist. Specifically, when such tiltable or standing seats are returned to the seated or latched position, occupants already in the vehicle are at an increased risk for incurring a pinch injury. For example, in the case of a vehicle with third row seating, the second row of seating may be capable of tilting forward to allow passengers to enter and exit the vehicle cabin. To tilt the second row seats forward, the user generally unlatches a rear portion of the seat permitting it to pivot forwardly. In some cases, these pivoting seat arrangements typically involve a latch and striker mechanism for retaining the seat in the secured or latched state when the seat is not being pivoted forward. When such a seat is pivoted forward, a space between the latch and striker is generated or revealed where an occupant of the vehicle sitting behind the pivoted seat can inadvertently place an appendage, (e.g., finger, hand, foot, etc.). As such, when the occupant or other individual pushes or pulls the seat in the rearward direction, the at risk occupant may inadvertently have his or her appendage pinched between the striker and latch mechanism of the seat.

SUMMARY

According to one aspect of the present disclosure, a tiltable anti-pinch vehicle seat assembly for an associated vehicle is provided. The seat assembly includes a seat and a tilt assembly is provided for supporting the seat and is disposed between the seat and a chassis of the associated vehicle. The tilt assembly is capable of moving the seat between a forward tilted position and a rearward latched position. The tilt assembly includes a first latching member. A second latching member is secured to the chassis of the associated vehicle for selectively engaging the latch and the latch and the striker cooperate to maintain the seat in the rearward latched position. A pinch guard housing is disposed about the first and second latching members. The housing substantially covers the first latching member, the second latching member, and a pinch zone defined between the first latching member and the second latching member when the tilt assembly is in the forward tilted position.

According to another aspect of the present disclosure, a pinch guard for an associated tiltable vehicle seat assembly is provided. The pinch guard includes a first side wall having a first end and a second end. A second side wall is spaced apart from and generally parallel to the first side wall. The second side wall includes a first end and a second end. A rear wall is disposed between the respective second ends of the first and second side walls. The first and second side walls and the rear wall form a first housing member having a generally U-shaped cross section. The first housing member is adapted to substantially conceal a latch and a striker of the associated seat assembly when the associated seat assembly is in a tilted state.

According to still another aspect of the present disclosure, a tiltable anti-pinch vehicle seat assembly for an associated vehicle is provided. The seat assembly includes a seat and a tilt assembly for supporting the seat and being disposed between the seat and a chassis of the associated vehicle. The tilt assembly is capable of moving the seat between a forward tilted position and a rearward latched position. The tilt assembly includes one of a latch and a striker. The other of the latch and the striker is secured to the chassis of the associated vehicle. The latch and striker are selectively engageable to maintain the seat in the rearward latched position. A pinch guard housing is disposed about the latch and the striker. The pinch guard housing includes a first side wall, a second side wall spaced apart from and generally parallel to the first side wall, and a rear wall disposed between the first and second side walls. The first and second side walls and the rear wall form a generally U-shaped cross section substantially covering the latch, the striker, and a pinch zone defined between the latch and the striker when the seat is in the forward tilted position.

BRIEF DESCRIPTION OF THE DRAWINGS

FIG. 8 is a side view of a second embodiment of a seating assembly including an alternate anti-pinch device or guard which utilizes a plurality of telescopic or segmented members.

FIG. 9 is an enlarged perspective view of the anti-pinch device or guard of FIG. 8.

FIG. 10 is a partial cross sectional view of the anti-pinch device or guard of FIG. 8 illustrating the engagement of each of the plurality of telescopic or segmented members.

DETAILED DESCRIPTION

Figure 1:
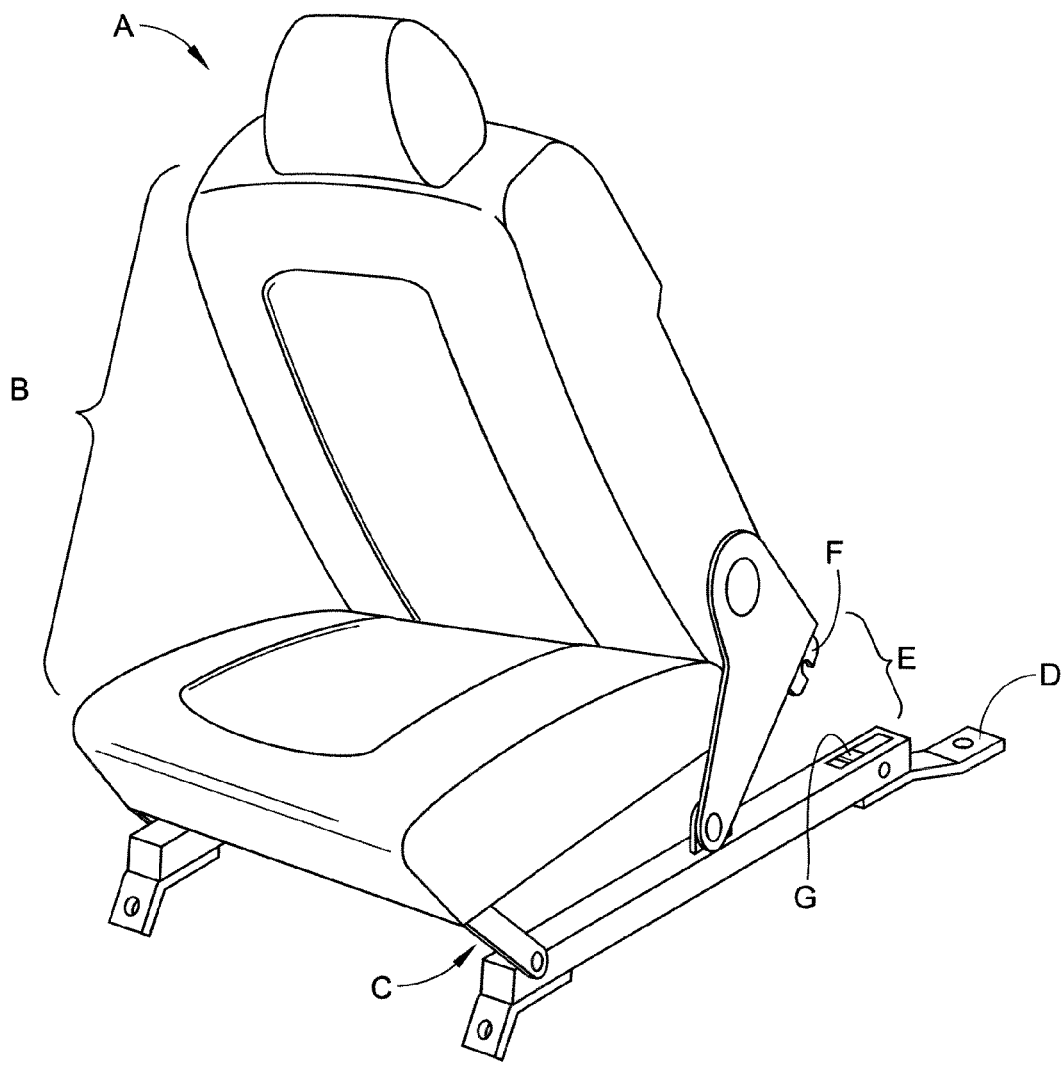
FIG. 1 is a perspective view of a prior art seat assembly in a forward or tilted position.
Figure 2:
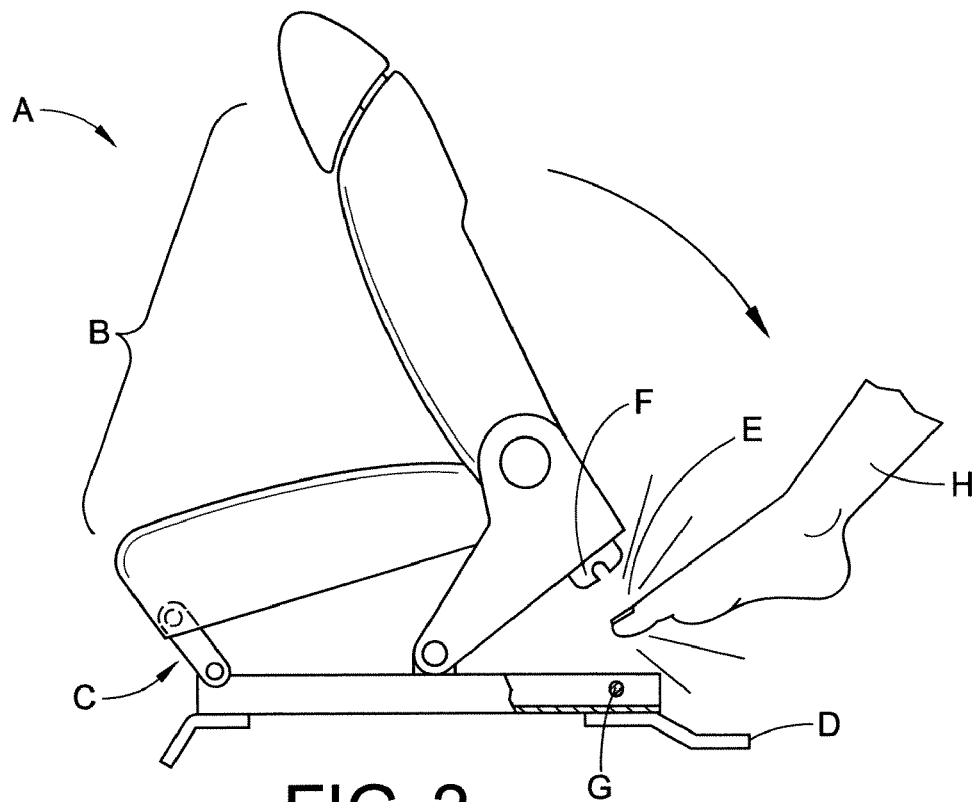
FIG. 2 is a side view of the prior art seat assembly of FIG. 1 in the forward or tilted position illustrating a potential pinch hazard for an occupant behind the seat.
Figure 3:
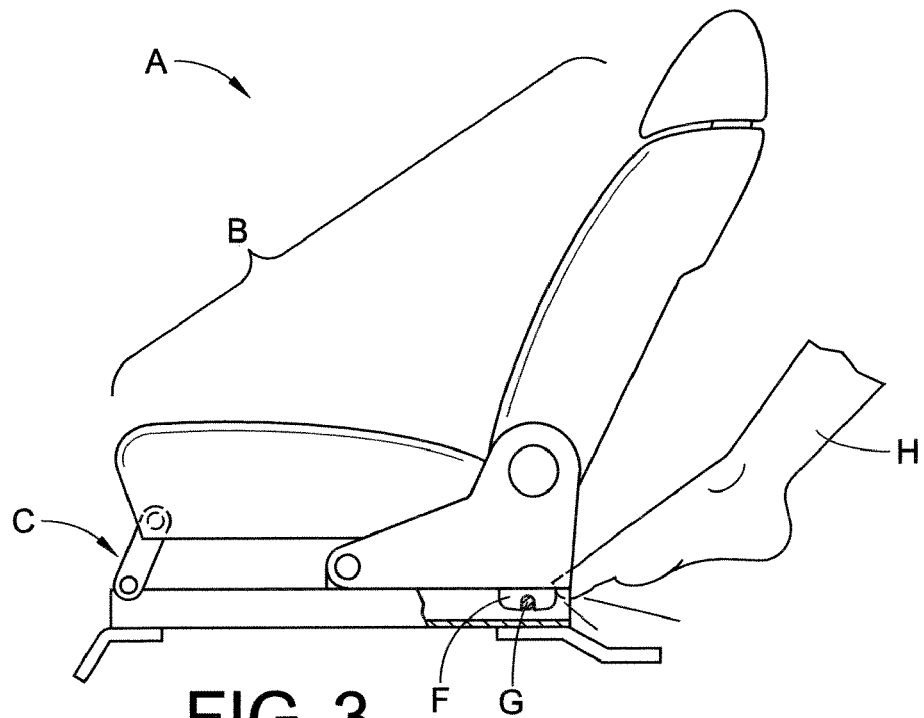
FIG. 3 is a side view of the prior art seat assembly of FIG. 2 illustrating the seat assembly in a semi-latched state and a human appendage caught between a latch and a striker of the prior art seat assembly.

With reference to FIGS. 1-3, a prior art vehicle seat assembly A is shown. The seat assembly A generally includes a seat portion B and a tilt mechanism or assembly C. As illustrated by FIGS. 1-3, tilt assembly C permits the seat portion B to be pivoted between a forward or tilted position (FIGS. 1 and 2) and a rearward or latched position (FIG. 3). When the seat portion B is in the tilted position, a space E is created between a latch F and a striker G which could allow for a human appendage, such as a foot H, to be inserted into the space or pinch zone E. As illustrated in FIG. 3, when the seat assembly A is placed into the latched state, a potential pinch hazard exists wherein the appendage H becomes trapped between the latch F and the striker G.

Figure 4:
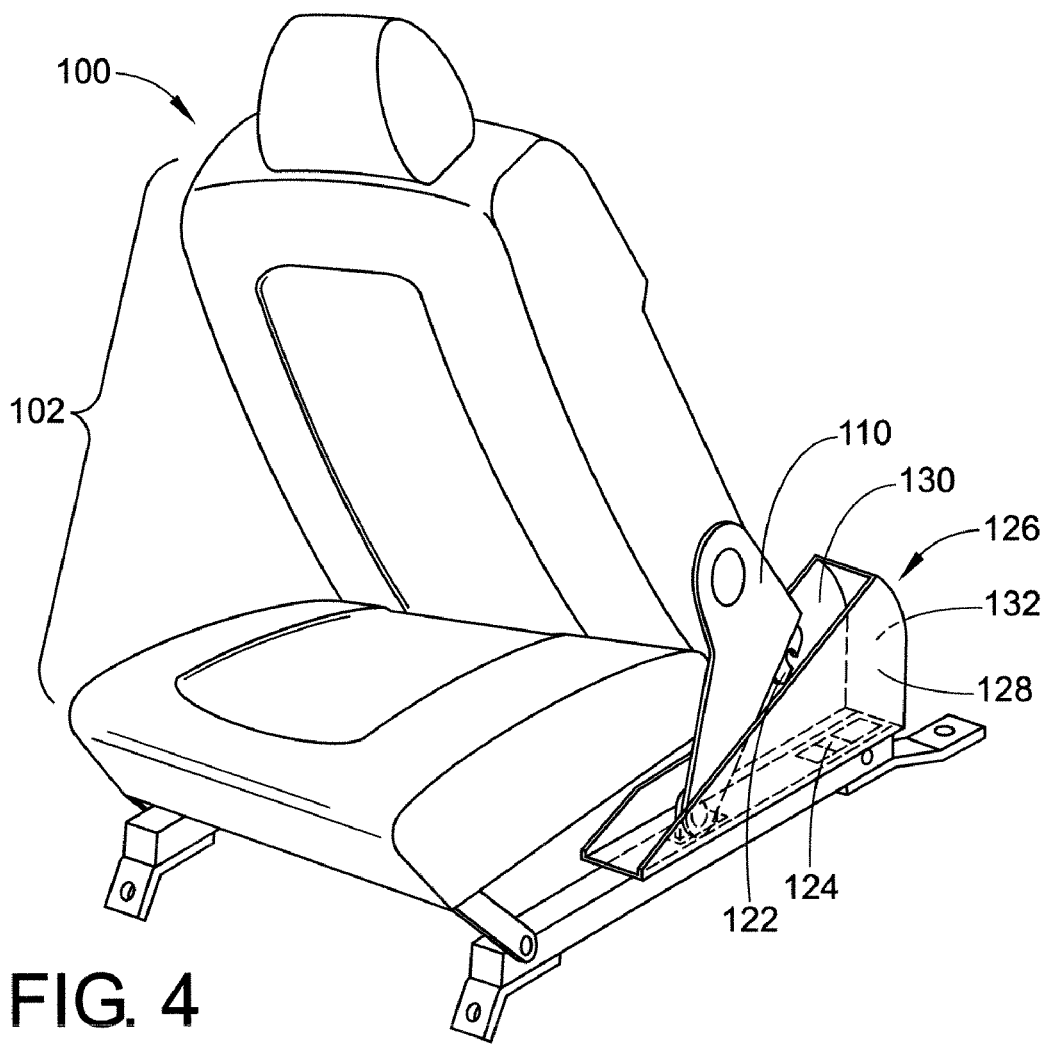
FIG. 4 is a perspective view of a first embodiment of a tiltable seat assembly including an anti-pinch device or guard.
Figure 6:
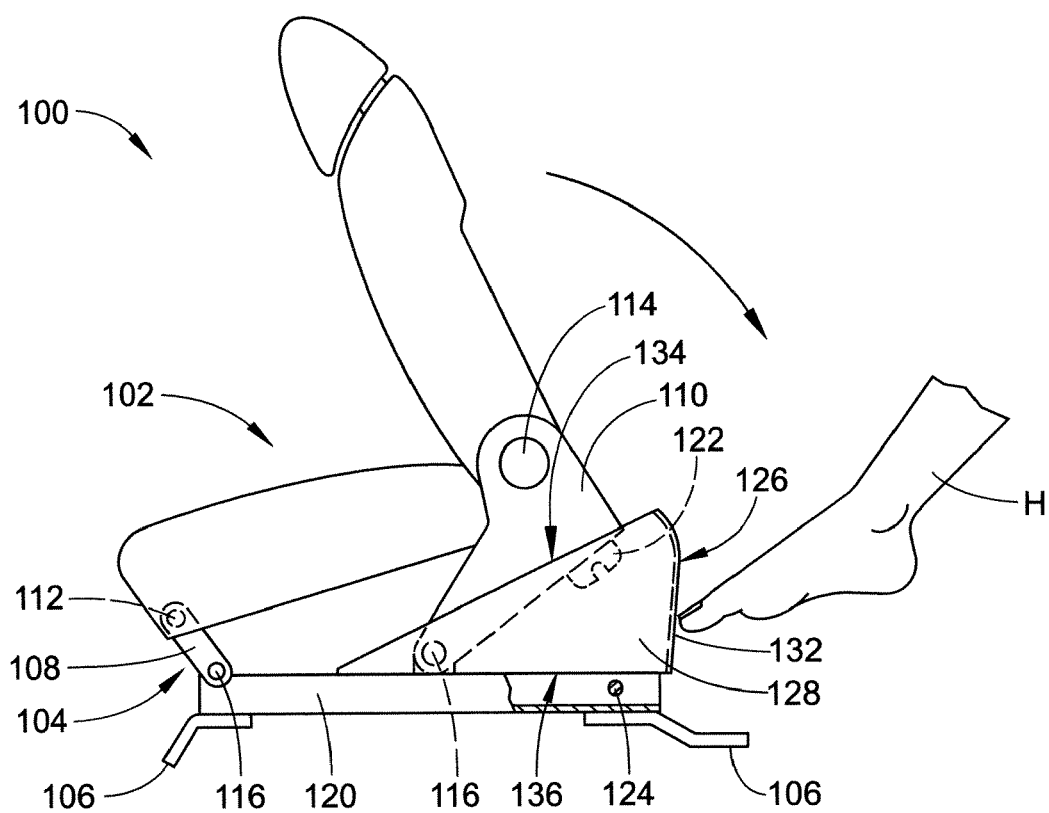
FIG. 6 is a side view of the seat assembly of FIG. 4 illustrating a human foot that is prevented from entering a pinch zone due to the anti-pinch device or guard.
Figure 7:
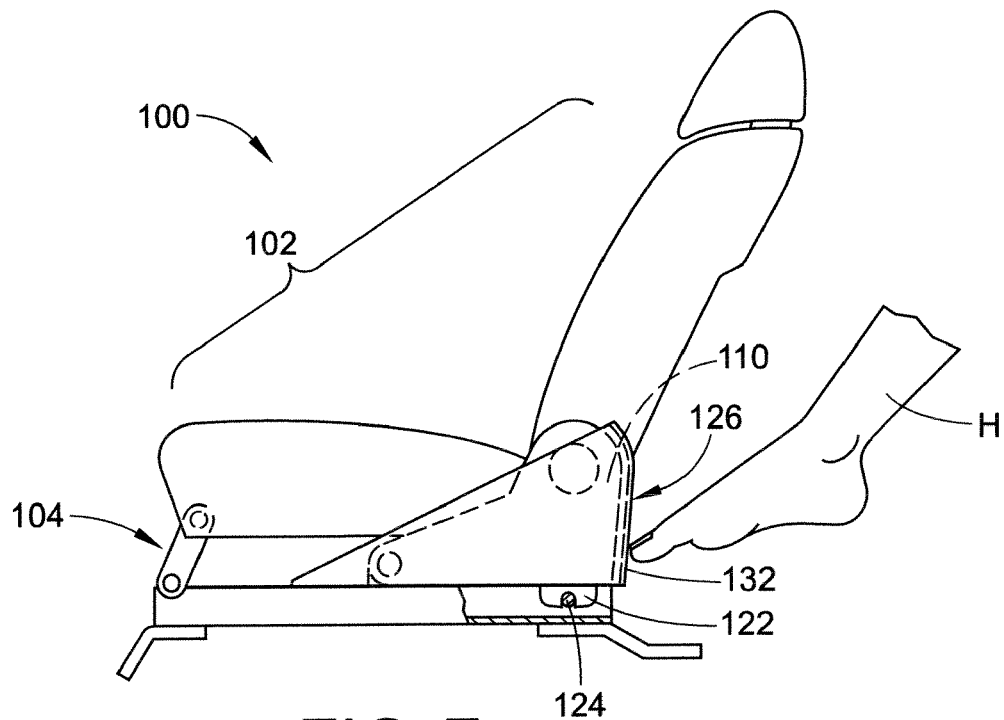
FIG. 7 is a side view of the seat assembly of FIG. 6 illustrating the seat assembly in a latched state in addition to the human foot that is guarded or prevented from entering the pinch zone.

With reference to FIGS. 4 and 6-7, a first embodiment of a tiltable anti-pinch vehicle seat assembly 100 is shown. Generally, the seat assembly 100 includes a seat portion 102, a tilt assembly 104 for securing the seat portion 102 to a chassis bracket 106. In addition, the tilt assembly 104 of the illustrated embodiment includes a first or forward pivoting member 108 and a second or rear pivoting member 110. In particular, the first and second pivoting members 108, 110 include a first pivoting joint 112, 114 and a second pivoting joint 116, 118. As shown, seat portion 102, first pivoting member 108, second pivoting member 110 and a generally fixed member 120 form a four-bar linkage which allows the seat portion 102 to pivot in a generally forward and upward direction thus permitting greater access for ingress and egress by an occupant to the area behind the tiltable seat assembly 100. Furthermore, a first latching member 122 (e.g., a latch) may be provided in the rear pivoting member 110 and a second latching member 124 (e.g., a striker) may be provided in the fixed member 120 (which may be part of another mechanism, e.g. an adjustable seat track) or another intermediate component that is otherwise secured to the chassis. It should also be noted that placement of the latching members (i.e., the latch and striker) can be reversed without affecting the operation of the tiltable seat assembly, and as such, the placement of the latch and the striker in the illustrated embodiments and any other embodiments discussed herein is by way of example only and not intended to limit the scope of the claims.

Figure 5:
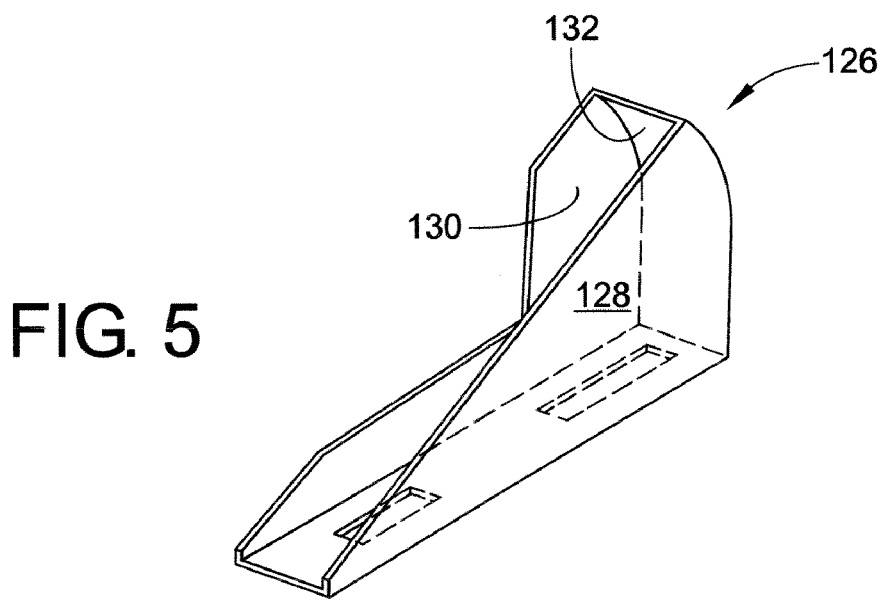
FIG. 5 is an enlarged perspective view of the anti-pinch device or guard of FIG. 4.

With continued referenced to FIGS. 4-6, the seat assembly 100 further includes a pinch guard housing 126 which includes a first side wall 128, a second side wall 130, which is spaced apart from and generally parallel to the first side wall 128, and a rear wall 132 disposed between the first and second side wall 128, 130. In general, the first and second side walls 128, 130 and the rear wall 132 are joined together so as to form a generally U-shaped cross section. It should be noted that the first or forward ends of the first and second side walls 128, 130 can be shorter in height than the second or rearward ends of the walls (forming a generally triangular shape) so as to adequately cover or accommodate the pivoting elements of the tilt assembly and/or to provide clearance for other components of the seat assembly (e.g., the seat cushion, etc.). In addition, an upper portion 134 of the pinch guard housing 126 is left substantially unobstructed between the first and second walls 120, 130 so as to allow the rear pivoting member 110 to pivot down and into the space defined between the first and second side walls 128, 130 and the rear wall 132 of the pinch guard housing 126. A lower portion 136 may be left open or can be sealed with a bottom wall adjoining all three first, second and rear walls 128, 130 and 132. In either case, the lower portion 136 of the pinch guard housing 126 is generally secured to either the fixed member 120 or another component that is generally secured to a chassis 106. Of course, a notch or other aperture may be included in the bottom wall to allow for proper operation of the latching mechanism.

As should be evident from the above discussion and by inspection of FIGS. 6-7, the use of a pinch guard housing 126 prevents the human foot H from being inserted into the pinch zone region E (FIG. 1-2) between the latch 122 and the striker 124. Thus, pinch injuries to the occupants of the vehicle are prevented or at least lessened while the ability of the seat assembly 100 to be pivoted or tilted is unaffected. Moreover, the inclusion of the pinch guard housing 126 does not further restrict the ability of occupants to enter or exit the vehicle from behind the seating assembly 100.

As discussed previously, FIG. 7 is a side view of the seating assembly 100 illustrated in FIG. 6. However, the seating portion 102 and the tilt assembly 104 are in the rearward or latched state. As illustrated, the rear pivoting member 110, the latch 122 and the striker 124 are all fully concealed within the pinch guard housing 126. At the same time, unlike the pinch scenario illustrated in FIGS. 2-3 of the human foot H, such a scenario is precluded because the human foot H cannot proceed any further forward than the rear wall 132 of the pinch guard 126 as shown in FIGS. 6 and 7.

Now with reference to FIG. 8, a second embodiment of a tiltable anti-pinch vehicle seat assembly 200 is shown. As with the first embodiment of the seat assembly 100 (FIG. 1), the seat assembly 200 also includes a seat portion 202, tilt assembly 204, a chassis portion 206, as well as first and second pivoting members 208, 210. However, the primary difference lies with the design of the pinch guard housing 226.

With particular reference to FIGS. 8 and 9, the pinch guard housing 226 includes two or more housing members or segmented portions. Specifically, the illustrated pinch guard housing 226 includes a first housing member or segmented portion 228, a second housing member or segmented portion 230, and a third housing member or segmented portion 232. As with the previous embodiment of the pinch guard housing 126 (FIGS. 4-7), the first, second and third segmented portions 228, 230, 232 of the pinch guard housing 226 each include or comprise a first wall, a second wall generally parallel to and spaced from the first wall, and a rear wall adjoining the first wall to the second wall. Also, a first or forward end of the respective first and second side walls can be shorter in height than a second or rearward end of the walls (forming a generally triangular shape). However, in the illustrated embodiment, the first, second and third segmented portions 228-232 are consecutively smaller in overall cross section such that the third segmented portion 232 can slide into and within the second segmented portion 230, which can slide into and within the first segmented portion 228. As such, the consecutively smaller segmented portions 228-232 allow the pinch guard housing 226 as an assembly to telescopically expand or collapse. In addition, the respective first ends of the first and second walls of the respective segmented portions can be pinned together or otherwise pivotally secured such that the segmented portions can rotate about a common axis. This common axis of rotation can be coincident with a pivot point of the tilt assembly to minimize interference between the tilt assembly and the segmented portions of the pinch guard.

With reference to FIG. 10, a partial cross section of the pinch guard 226 is shown illustrating the engagement of the first, second, and third segmented portions 228-232. In particular, the first segmented portion 228 includes a mounting flange 234 that may be used to secure the first segmented portion 228 to the second pivoting member 210 (FIG. 8) and a lower lip 236 for engaging an upper lip 238 of the second segmented portion 230. Similarly, the second segmented portion 230 includes a lower lip 240 for engaging an upper lip 242 of the third segmented portion 232. The respective upper and lower lips or flanges come into contact when the guard is urged into its expanded state thus "pulling up" the individual segmented portions in a telescopic manner. For example, when the seat 200 (FIG. 8) is tilted forwardly, the first segmented portion 228 is urged upward causing the lower lip 236 to urge the second segmented portion 230 upward by placing an upward pressure on the upper lip 238 and so forth. Of course, other similar methods can be employed for allowing a series of segmented portions of the pinch guard to slide with respect to one another, effectively increasing and decreasing the height or area needed to obscure the pinch zone from a human appendage, while not permitting any substantial gaps to occur between the segmented portions.

The ability to expand and collapse accommodates the seating assembly 200 when it is moved between a forward or tilted state and a rearward or latched state. While the pinch guard housing 226 operates in a different manner than the pinch guard housing of the first embodiment, the effect of precluding a human foot H (FIG. 8) or other appendage from entering into the pinch zone (i.e., between the latch 222 and the striker 224 of the seat assembly 200) is the same. It should also be noted that the first segment portion 228 can be secured to the moving portion of the seat (e.g., the second or rear pivoting member 210) and the second housing 230 or, as in the instant embodiment, the third segmented housing 232 is attached or secured to a non-tilting portion of the seat assembly 200 such that it remains generally fixed with respect to the striker 224.

Figure 11:
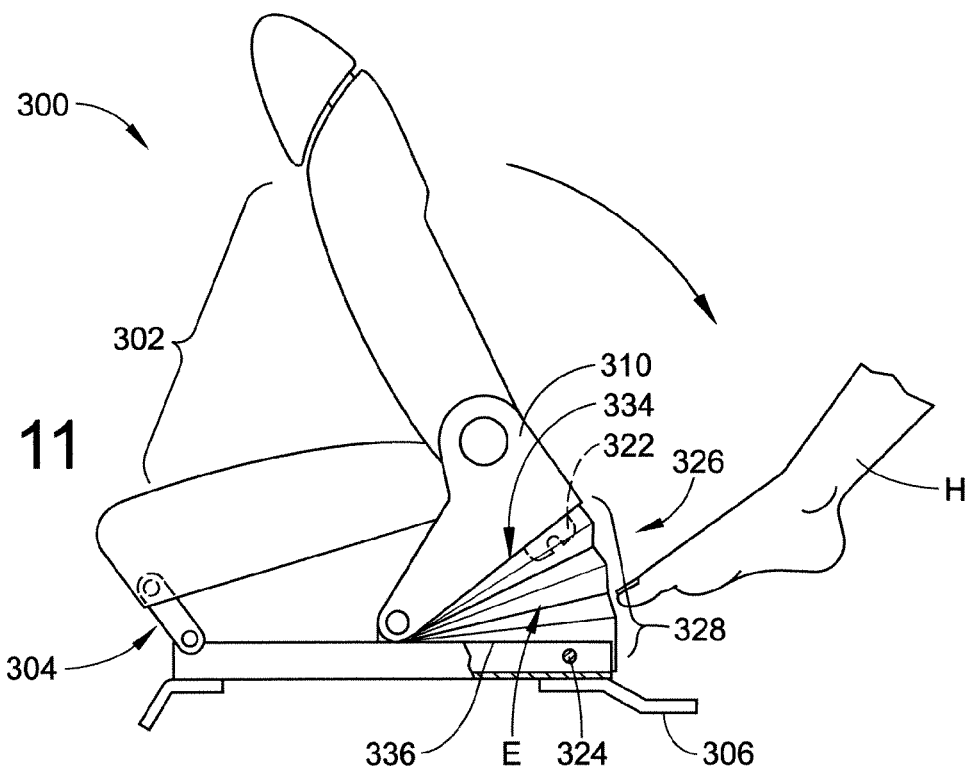
FIG. 11 is a side view of a third embodiment of a seating assembly with another alternate anti-pinch device or guard that includes a plurality of pleats.
Figure 12:
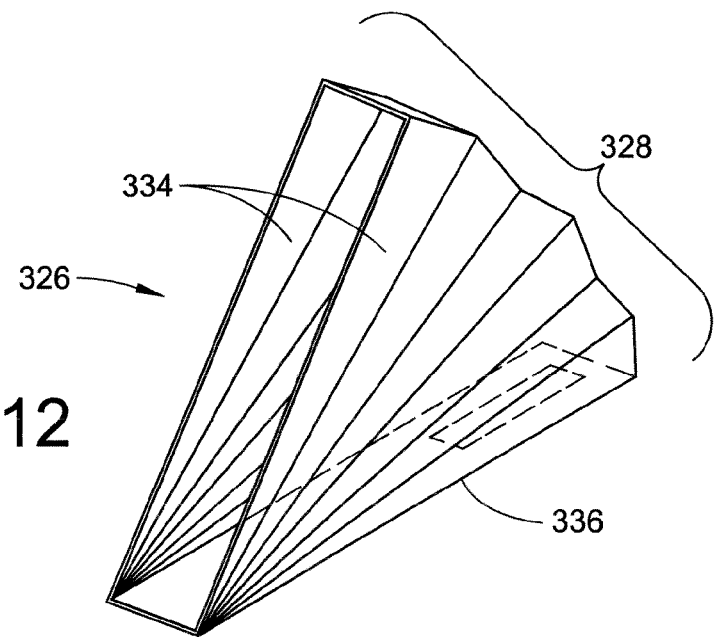
FIG. 12 is an enlarged perspective view of the anti-pinch device or guard of FIG. 11.

Now with reference to FIG. 11, a third embodiment of a tiltable anti-pinch vehicle seat assembly 300 is shown. As before, the seating assembly 300 includes a seat portion 302, a tilt assembly 304, a chassis portion 306 and a pinch guard housing 326. As with the previous embodiments, the pinch guard housing 326 (FIG. 12) serves to prevent the human foot H or other appendage from entering into a pinch zone E located between the latch 322 and striker 324 of the seat assembly 300. However, as best illustrated in FIG. 12, the pinch guard 326 utilizes a flexible, collapsible, and resilient material containing a plurality of pleats 328. This allows the material of the pinch guard 326 to fold accordion-like in onto itself as it is urged into a downward position when the seat assembly 300 is placed into the latched state. Similarly, the pleats allow the pinch guard 326 to expand accordion-like to accommodate the change in height as the rear portion of the seat assembly 300 is raised and the seat assembly 300 is placed into the tilted state. Also, as with the previously described embodiments, an upper portion of the housing 334 can be attached to the rear pivoting portion or member 310 of the seat assembly, whereas a lower portion 336 of the pinch guard housing 326 is secured to a non-tilting portion of the seat assembly 300 or secured to some other part of the vehicle chassis 306.

A tiltable anti-pinch vehicle seat assembly and a pinch guard have been described with reference to particular embodiments. Modifications and alterations will occur to those upon reading and understanding the preceding detailed description. The invention is not limited to only those embodiments described above. Instead, the invention is broadly defined by the appended claims and the equivalents thereof.

The invention claimed is:

1. A tiltable anti-pinch vehicle seat assembly for an associated vehicle, the seat assembly comprising:
    a seat;
    a tilt assembly for supporting the seat and being disposed between the seat and a chassis of the associated vehicle, the tilt assembly capable of moving the seat between a forward tilted position and a rearward latched position, the tilt assembly including a first latching member;
    a second latching member secured to the chassis of the associated vehicle for selectively engaging the first latching member, wherein one of the first latching member and the second latching member is a striker and the other of the first latching member and the second latching member is a latch selectively lockable to the striker to maintain the seat in the rearward latched position; and
    a pinch guard housing disposed about the first and second latching members, the housing substantially covering the first latching member, the second latching member, and a pinch zone defined between the first latching member and the second latching member when the tilt assembly is in the forward tilted position, wherein the pinch guard housing further includes a first side wall, a second side wall spaced apart from and generally parallel to the first side wall, and a rear wall disposed between the first and second side walls and rearward of the first and second latching members, the first and second side walls extending forward from the rear wall and flanking the first and second lathing members.

2. The seat assembly of claim 1 wherein at least one of the first and second side walls tapers downward from a first height adjacent the rear wall to a second height spaced apart from the rear wall.

3. The seat assembly of claim 1, wherein the first and second side walls and the rear wall of the housing form a generally U-shaped cross section at least one of the first and second side walls having a longitudinal length greater than a distance between the first and second side walls.

4. The seat assembly of claim 3, wherein the pinch zone is a space defined between the first, second, and rear walls of the housing.

5. The seat assembly of claim 1, wherein the pinch guard housing comprises at least a first and a second generally U-shaped housing member, the first housing member having a slightly smaller cross section than the second housing member such that the first housing member can be slideably received into the second housing member in a telescopic manner.

6. The seat assembly of claim 1, wherein the pinch guard housing is formed from a resilient collapsible material.

7. A tiltable anti-pinch vehicle seat assembly for an associated vehicle, the seat assembly comprising:
    a seat;
    a tilt assembly for supporting the seat and being disposed between the seat and a chassis of the associated vehicle, the tilt assembly capable of moving the seat between a forward tilted position and a rearward latched position, the tilt assembly including a first latching member;
    a rear pivoting member, having a first end rotatably secured to the chassis of the associated vehicle and a second end rotatably secured to the seat, the first latching member of the tilt assembly being secured proximal to the second end of the rear pivoting member;
    a second latching member secured to the chassis of the associated vehicle for selectively engaging the first latching member, wherein the first latching member and the second latching member cooperate to maintain the seat in the rearward latched position; and
    a pinch guard housing disposed about the first and second latching members, the housing substantially covering the first latching member, the second latching member, and a pinch zone defined between the first latching member and the second latching member when the tilt assembly is in the forward tilted position.

8. The seat assembly of claim 7 wherein the first and second sidewalls have longitudinal lengths greater than a spacing between the first and second side walls.

9. The seat assembly of claim 8 wherein the first and second side walls taper downward from the rear wall to a location spaced apart from the rear wall.

10. A tiltable vehicle seat assembly, comprising:
a seat;
a tilt assembly for supporting the seat, the tilt assembly capable of moving the seat between a forward tilted position and a rearward latched position, the tilt assembly including one of a striker and a latch, the other of the striker and the latch mounted to a vehicle floor below the seat, the latch selectively lockable to the striker for securing the seat in the rearward latched position; and a pinch guard including:
a first side wall having a first end and a second end;
a second side wall spaced apart from and generally parallel to the first side wall, the second side wall having a first end and a second end;
a rear wall disposed between the respective second ends of the first and second side walls, the rear wall disposed rearward of the striker and the latch; and
wherein the first and second side walls and the rear wall form a first housing member having a generally U-shaped cross section, the first and second side walls extending forward from the rear wall a distance greater than spacing between the first and second side walls and disposed in flanking relation relative to the striker and the latch, the first housing member is adapted to substantially conceal at least one of the latch and the striker when the seat is in the tilted position.

11. The pinch guard of claim 10, wherein a height of the respective first ends of the first and second side walls is shorter than the height of the respective second ends of the first and second side walls thereby forming a generally triangular shape.

12. The pinch guard of claim 10, further including a second housing member, the second housing member including a first side wall, a second side wall, and a rear wall formed in a generally U-shaped configuration, the first housing member having a slightly smaller cross section than the second housing member such that the first housing member can be slideably received into the second housing member in a telescopic manner.

13. The pinch guard of claim 12, wherein the first and second housing members are pivotally secured at the respective first ends of the first and second side walls.

14. The pinch guard of claim 13, wherein the first housing member is substantially received into the second housing member when the associated seat assembly is in a latched state.

15. The pinch guard of claim 10, wherein the first and second side walls and rear wall of the first housing member are integrally formed from a resilient collapsible material.

16. The pinch guard of claim 15, wherein the first housing member includes a plurality of pleats such that a height of the first housing member is adjustable between a collapsed state when the associated seat assembly is in a latched state and an expanded state when the associated seat assembly is in the tilted state.

17. The pinch guard of claim 16, wherein an upper portion of the first housing member is secured to a pivoting member of the associated seat assembly and wherein a lower portion of the first housing member is secured to a fixed member of the associated seat assembly.

18. A tiltable anti-pinch vehicle seat assembly for an associated vehicle, the seat assembly comprising:
a seat;
a tilt assembly for supporting the seat and being disposed between the seat and a chassis of the associated vehicle, the tilt assembly capable of moving the seat between a forward tilted position and a rearward latched position, the tilt assembly including one of a latch and a striker, the other of the latch and the striker being secured to the chassis of the associated vehicle, the latch and striker being selectively engageable to maintain the seat in the rearward latched position; and
a pinch guard housing disposed about the latch and the striker, the pinch guard housing including a first side wall disposed immediately adjacent a first lateral side of the latch and the striker, a second side wall disposed immediately adjacent a secured lateral side of the latch and the striker, and also spaced apart from and generally parallel to the first side wall, and a rear wall disposed between the first and second side walls rearward of and immediately adjacent the latch and the striker, the first and second side walls and the rear wall forming a generally U-shaped cross section substantially covering the latch, the striker, and a pinch zone defined between the latch and the striker when the seat is in the forward tilted position.

19. The seat assembly of claim 18, wherein a height of the respective first ends of the first and second side walls is shorter than the height of the respective second ends of the first and second side walls thereby forming a generally triangular shape.

20. The seat assembly of claim 18, wherein the tilt assembly further includes a forward pivoting member and a rear pivoting member, the forward and rear pivoting members having a first end rotatably secured to the chassis of the associated vehicle and a second end rotatably secured to the seat, wherein the forward and rear pivoting members, the chassis, and the seat are connected via rotatable joints to form a four-bar linkage.

21. The seat assembly of claim 20, wherein the latch is secured proximally to the second end of the rear pivoting member and the striker is secured to the chassis of the associated vehicle.

22. The seat assembly of claim 18, wherein the pinch guard housing comprises a first and a second housing member, the first and second housing members including a first side wall, a second side wall, and a rear wall formed in a generally U-shaped configuration, the first housing member having a slightly smaller cross section than the second housing member, wherein the first and second housing members are pivotally secured at the respective first ends of the first and second side walls such that the first housing member can be slideably received into the second housing member.

* * * * *